US006963526B2

(12) United States Patent
Takemoto et al.

(10) Patent No.: US 6,963,526 B2
(45) Date of Patent: Nov. 8, 2005

(54) DISC RECORDING APPARATUS, DISC RECORDING METHOD, AND DISC RECORDING CONTROL PROGRAM

(75) Inventors: Tadashi Takemoto, Hamamatsu (JP); Hisanori Itoga, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 318 days.

(21) Appl. No.: 10/304,326

(22) Filed: Nov. 26, 2002

(65) Prior Publication Data

US 2003/0147324 A1 Aug. 7, 2003

(30) Foreign Application Priority Data

Nov. 27, 2001 (JP) .......................... P2001-361390

(51) Int. Cl.[7] .............................................. G11B 7/00
(52) U.S. Cl. ................ 369/53.29; 369/53.2; 369/53.24
(58) Field of Search .......................... 369/275.3, 53.29, 369/53.2, 53.1, 53.16, 53.22, 53.24, 53.36, 369/47.27, 47.31

(56) References Cited

U.S. PATENT DOCUMENTS 5,914,917 A * 6/1999 Bae ......................... 369/30.09
6,418,112 B1 * 7/2002 Kuroda et al. ........... 369/275.4
6,487,151 B1 * 11/2002 Nagata et al. ........... 369/47.51

* cited by examiner

*Primary Examiner*—Nabil Hindi
(74) *Attorney, Agent, or Firm*—Pillsbury Winthrop Shaw Pittman LLP

(57) ABSTRACT

When data in a volume in the excess of a specification of a disc is recorded on an optical disc (D) (overburn recording), overburn area information indicating a position to terminate data recording is set in a volatile memory (333) of an optical disc recording apparatus (300). The optical disc recording apparatus records the data in an overburn area of the optical disc by referring to the overburn area information set in the volatile memory and terminate the recording of the data when the recording position in the current point in time agrees with the position to terminate recording indicated by the overburn area information that is set in a second storage area **(333*b*)**.

21 Claims, 7 Drawing Sheets

< OVERBURN AREA MANAGEMENT TABLE TA >

| DISC IDENTIFICATION INFORMATION | | OVERBURN AREA INFORMATION |
|---|---|---|
| MANUFACTURER IDENTIFICATION CODE | PRODUCT IDENTIFICATION CODE | ADDRESS CORRESPONDING TO POSITION TO TERMINATE RECORDING |
| Y · · · | Y-A · · · | ●×× · · · |
| Y · · · | Y-B · · · | ×▲● · · · |
| ⋮ | ⋮ | ⋮ |
| N · · · | N-A · · · | ×●▲ · · · |
| ⋮ | ⋮ | ⋮ |

DISC RECORDING APPARATUS, DISC RECORDING METHOD, AND DISC RECORDING CONTROL PROGRAM

BACKGROUND OF THE INVENTION

The present invention relates to a disc recording apparatus, a disc recording method, and a disc recording control program that make it possible to record data in an overburn area of a disc.

In the field of optical discs such as CD-R (Compact Disc Recordable), optical disc recording apparatuses are spreading which have a function (so-called overburn function) of recording data (e.g. 90 minutes=790M MB) in excess in a volume defined in the standard on an optical disc having a specification (e.g., 74 minutes=650 MB) in accordance with a disc standard such as Orange Book.

FIG. 8 is a diagram schematically showing a layout of an optical disc.

A recordable area of an optical disc D includes an area for normal recording within a disc specification defined in a disc standard and an overburn area that is out of the disc specification.

When data in a volume in the excess of the disc specification is recorded on the optical disc D by using an optical disc recording apparatus having such an overburn function (e.g., when data of 790 MB is recorded on the optical disc D in which the size of the normal recording area is 650 MB), the optical disc recording apparatus keeps on recording beyond the normal recording area to enter the overburn area utilizing the overburn function, and such a recording operation is terminated when it reaches a no-address information area (which is an area having no positional information on an outer circumference of the disc) formed outside the overburn area where a servo error occurs.

However, when data recording is continued until a servo error occurs as described above, the optical disc recording apparatus and the optical disc can be damaged. Specifically, since a laser beam emitted by the optical disc recording apparatus toward the optical disc during data recording has very high power, when the laser beam is emitted toward the non-address information area as it is with the power maintained, and if the optical disc operates abnormally due to a servo error, there is a problem that the recorded data area of the optical disc D and the optical pickup (not shown) are damaged

SUMMARY OF THE INVENTION

The invention has been conceived taking the above-described situation into consideration and it provides a disc recording apparatus, a disc recording method, and a disc recording control program that allow a recording operation to be properly terminated when data is recorded in an overburn area of a disc without any abnormal operation of the disc recording apparatus.

In order to solve the above-described problems, a disc recording apparatus according to the invention is a disc recording apparatus capable of recording data in a recording area out of a specification of a disc, characterized in that it has a storage unit for storing overburn area information for determining a position to terminate data recording and a recording control unit for terminating an operation of recording data on a disc when it is detected that the recording position of the data on the disc has reached the position to terminate data recording determined by the overburn area information during recording of the data in the overburn area of the disc.

In such a configuration, the recording control unit terminates an operation of recording data on a disc when it is detected that the recording position of the data on the disc has reached a position to terminate data recording determined by overburn area information that is stored in the storage unit in association with identification information of the disc during recording of the data in a recording area out of the specification of the disc (i.e., an overburn area).

Since the data recording operation is thus terminated without continuing data recording until a servo error occurs, no abnormal operation of the disc recording apparatus occurs, which makes it possible to terminate the recording operation properly.

A disc recording apparatus according to the invention is a disc recording apparatus capable of recording data in an overburn area of a disc, characterized in that it has an input unit for inputting an instruction to start recording the data on the disc, a determination unit for determining a position to terminate data recording in the overburn area by tracing the disc after the recording start instruction is input with the input unit and before recording of the data on the disc is started, and a recording control unit for terminating the operation of recording the data on the disc when it is detected that the recording position of the data on the disc has reached the position to terminate data recording determined by the determination unit during recording of the data in the overburn area of the disc after recording of data on the disc is started.

In such a configuration, the recording control unit terminates the operation of recording the data on the disc when it is detected that the position to terminate recording determined by the determination unit has been reached during recording of the data in the overburn area.

Since the data recording operation is thus terminated without continuing data recording until a servo error occurs, no abnormal operation of the disc recording apparatus occurs, which makes it possible to terminate the recording operation properly. Since the power of a laser beam emitted toward the disc during tracing is smaller than the power of a laser beam emitted toward the disc during data recording, problems such as a damage to the disc recording apparatus and the optical disc will not occur.

A disc recording method according to the invention is a method of recording data in an overburn area of a disc, characterized in that it has the steps of reading overburn area information associated with the disc from a storage unit for storing overburn area information for determining positions to terminate data recording and terminating an operation of recording the data on the disc when it is detected that the recording position of the data on the disc has reached a position to terminate data recording determined by the overburn area information during recording of the data in the overburn area of the disc.

A data recording control method according to the invention is a method of recording data in an overburn area of a disc, characterized in that it has the steps of inputting an instruction to start recording of data on the disc, determining a position to terminate data recording in the overburn area by tracing the disc after the recording start instruction is input and before recording of the data on the disc is started, and terminating the operation of recording the data on the disc when it is detected that the recording position of the data on the disc has reached the position to terminate data recording thus determined during recording of the data in the overburn area of the disc after recording of data on the disc is started.

A disc recording control program according to the invention is characterized in that it causes a computer of a disc recording apparatus capable of recording data in an overburn area of a disc to function as a storage unit for storing overburn area information for determining a position to terminate data recording and as a recording control unit for terminating the operation of recording data on the disc when it is detected that the recording position of the data on the disc has reached the position to terminate data recording determined by the information regarding the overburn area during recording of the data in the overburn area of the disc.

A disc recording control program according to the invention is characterized in that it causes a computer of a disc recording apparatus capable of recording data in an overburn area of a disc to function as an input unit for inputting an instruction to start recording data on the disc is a determination unit for determining a position to terminate data recording in the overburn area by tracing the disc after the recording start instruction is input with the input unit and before recording of the data on the disc is started, and a recording control unit for terminating the operation of recording the data on the disc when it is detected that the recording position of the data on the disc has reached the position to terminate data recording determined by the determination unit during recording of the data in the overburn area of the disc after recording of data on the disc is started.

DETAILED DESCRIPTION OF PREFERRED EMBODIMENTS

An embodiment of the invention will be described with reference to the drawings.

A. Embodiment (1) Configuration of the Embodiment

Figure 1:
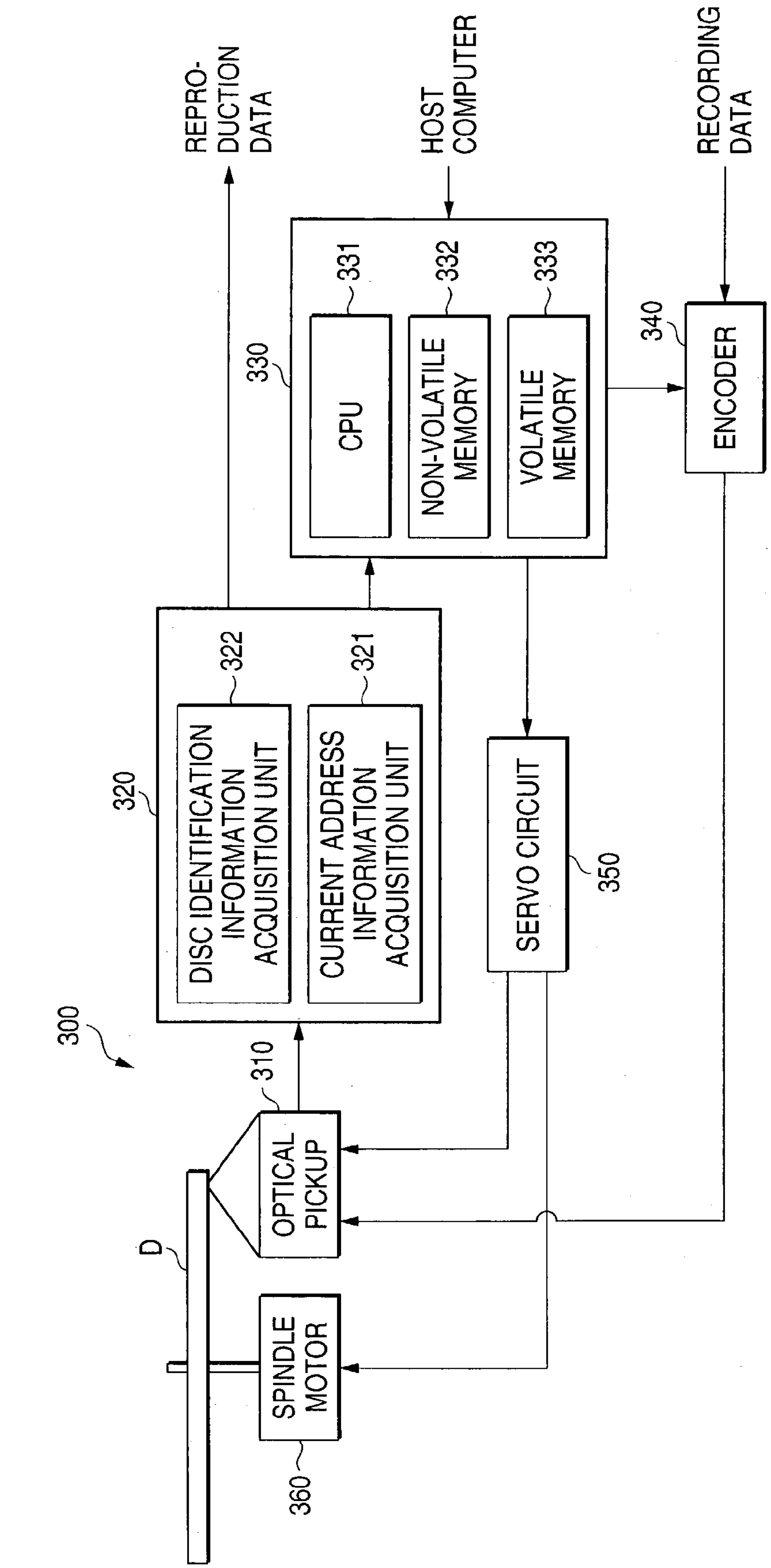
FIG. 1 is a diagram showing a configuration of a disc recording apparatus according to an embodiment of the invention.

FIG. 1 is a diagram showing a configuration of an optical disc recording apparatus 300 having an overburn function according to an embodiment of the invention.

An optical pickup 310 emits a laser beam according to EEM (Eight to Fourteen Modulation) recording data that is supplied from an encoder 340 to write the data to be recorded on an optical disc D such as a CD-R and outputs a return laser light emitted by the optical disc D to a decoder 320 as a return optical signal.

The decoder 320 demodulates the return optical signal supplied from the optical pickup 310 to output reproduction data, and includes a current address information acquisition unit 321 for acquiring address information indicating the current position (absolute time) of the optical pickup 310 in the disc D from the return optical signal and a disc identification information acquisition unit 322 for acquiring identification information for identifying the optical disc D (e.g., the manufacture and type of the disc) from the return optical signal. When address information and identification information is acquired by the current address information acquisition unit 321 and the disc identification information acquisition unit 322, the decoder 320 outputs the same to a control section 330.

The control section 330 is constituted by a CPU (Central Processing Unit) 331, a non-volatile memory 332, and a volatile memory 333, and has a function of controlling each part of the optical disc recording apparatus 300 and a function of performing overburn recording (which will be detailed later) to record data in an overburn area of the optical disc D.

Figures 2, 3:
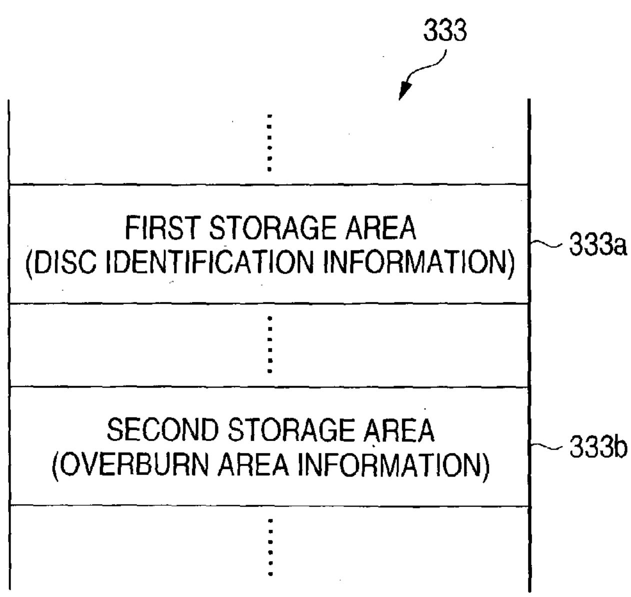
FIG. 2 illustrates an overburn management table according to the embodiment.
FIG. 3 is an illustration for explaining a volatile memory according to the embodiment.

For example, the non-volatile memory 332 is constituted by a ROM (Read Only Memory), an EEPROM (Electronically Erasable and Programmable Read Only Memory), and a flash memory to store various control programs and data such as a control program for the overburn recording process and to store an overburn area management table TA that is shown in FIG. 2.

FIG. 2 shows an overburn area management table TA.

In the overburn area management table TA, disc identification information for identifying optical discs D and overburn area information regarding overburn areas is registered in association with each other. As shown in FIG. 2, in the overburn area management table TA, manufacturer identification codes (e.g., "Y . . . " and "N . . . ") for identifying manufacturers of optical discs D and product identification codes (e.g., "Y-A . . . " and "Y-B . . . ") indicating the types of the optical discs D are registered as the disc identification information, and addresses corresponding to positions to terminate recording in overburn areas are registered as the overburn area information.

Figure 8:
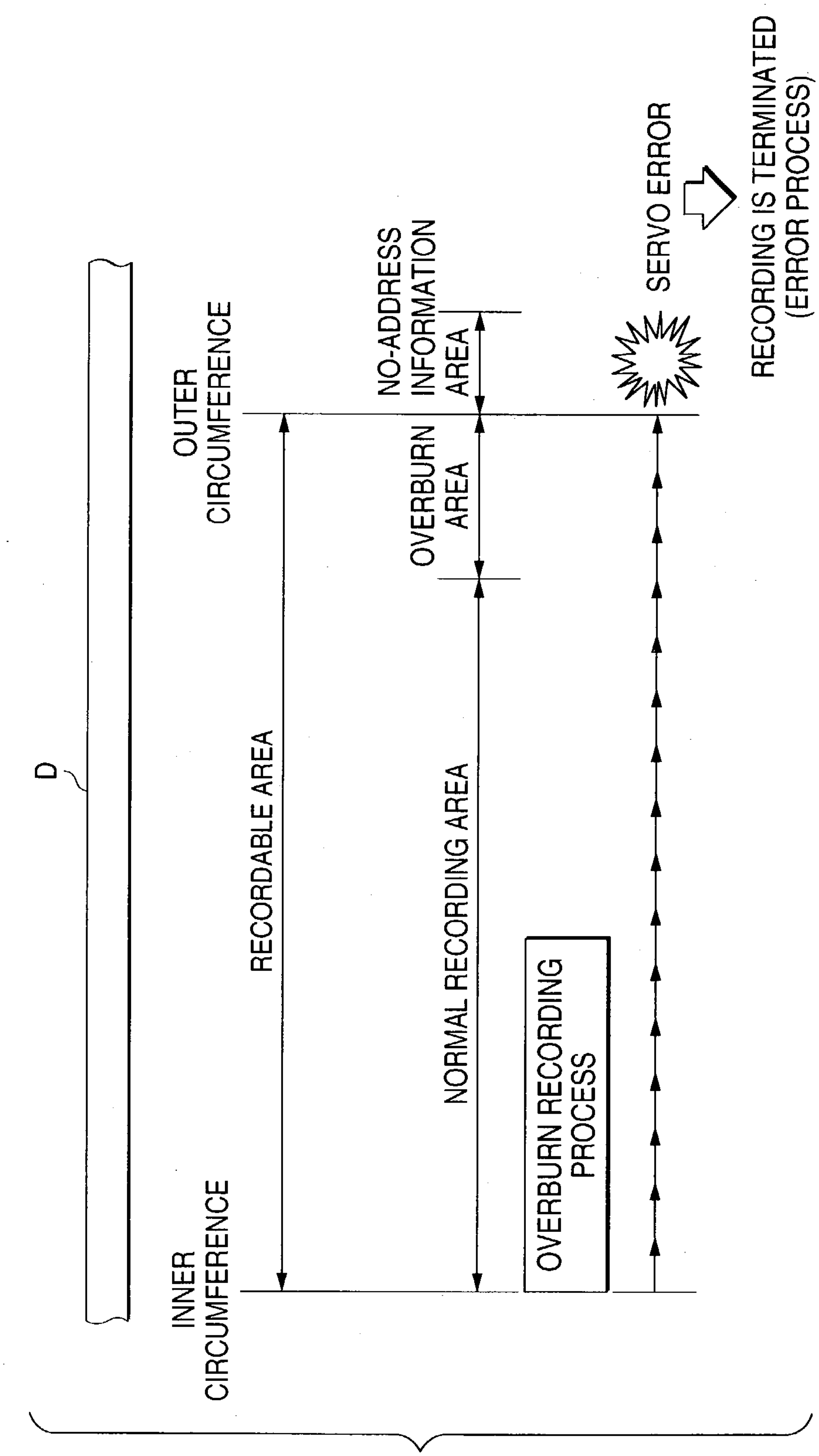
FIG. 8 illustrates an overburn recording process according to the related art.

While manufacturer identification codes and product identification codes are shown as an example of the disc identification information in the present embodiment, various types of information that allow identification of optical discs D may be used, such information including volumes of data that can be recorded in normal recording areas (see FIG. 8)) of the optical discs D (e.g., "650 MB" and "700 MB"), for example. While addresses corresponding to positions to terminate recording in overburn areas are shown as an example of the overburn area information, various types of information that allow identification of positions to terminate recording in overburn areas may be used, such information including information indicating the sizes of overburn areas, that is, volumes of data that can be recorded in overburn areas (e.g., "30 MB" and "40 MB") or times equivalent to the volumes of data (e.g., "2 minutes and 30 seconds" and "3 minutes"), for example. When times equivalent to data volumes are used as the overburn area information, it may be determined to continue or terminate recording of data by referring to time information included in the data to be recorded, for example.

The volatile memory 333 is constituted by an SDM (Static Random Access Memory) or a DRAM (Dynamic Random Access Memory), and has a first storage area 333_a_ for storing disc identification information acquired by the disc identification information acquisition unit 322 and a second storage area 333*b* for storing overburn area information, as shown in FIG. 3.

The CPU 331 performs overburn recording by referring to the overburn area information stored in the second storage area 333*b*. When the CPU 331 terminates overburn recording when it judges that current address information supplied by the current address information acquisition unit 321 corresponds to the overburn information (that is an address corresponding to a position to terminate recording in an overburn area) stored in the second storage area 333*b*. Details of such overburn recording will be made clear in a section for describing operations of the embodiment.

Referring to FIG. 1, the encoder 340 performs an EFM process and a time base correcting process on data to be recorded that is supplied from a host computer for example and supplies the processed recording data to the optical pickup 310 through a laser driver that is not shown to drive a laser diode (not shown) of the optical pickup 310.

A servo circuit 350 performs control for driving a spindle motor 360 at a linear velocity that is set in accordance with a control signal indicating a set velocity supplied by the control section 330 and performs focus control, tracking control, and feed control-of the optical pickup 310.

A detailed description will now be made on an operation of recording data in a volume in the excess of a disc specification (that is, overburn recording) by using the optical disc recording apparatus 300 having an overburn function according to the present embodiment.

(2) Operations of the Embodiment

A user loads an optical disc D that is a data recording medium into the optical disc recording apparatus 300 and thereafter operates an operating section of a host computer to input an instruction to record data that has been stored in a hard disc (not shown) into the optical disc D, the data having a volume in the excess of the specification of the disc. When such an instruction is input, the CPU 331 of the optical disc recording apparatus 300 activates a control program for an overburn recording process stored in the non-volatile memory 332.

Figure 4:
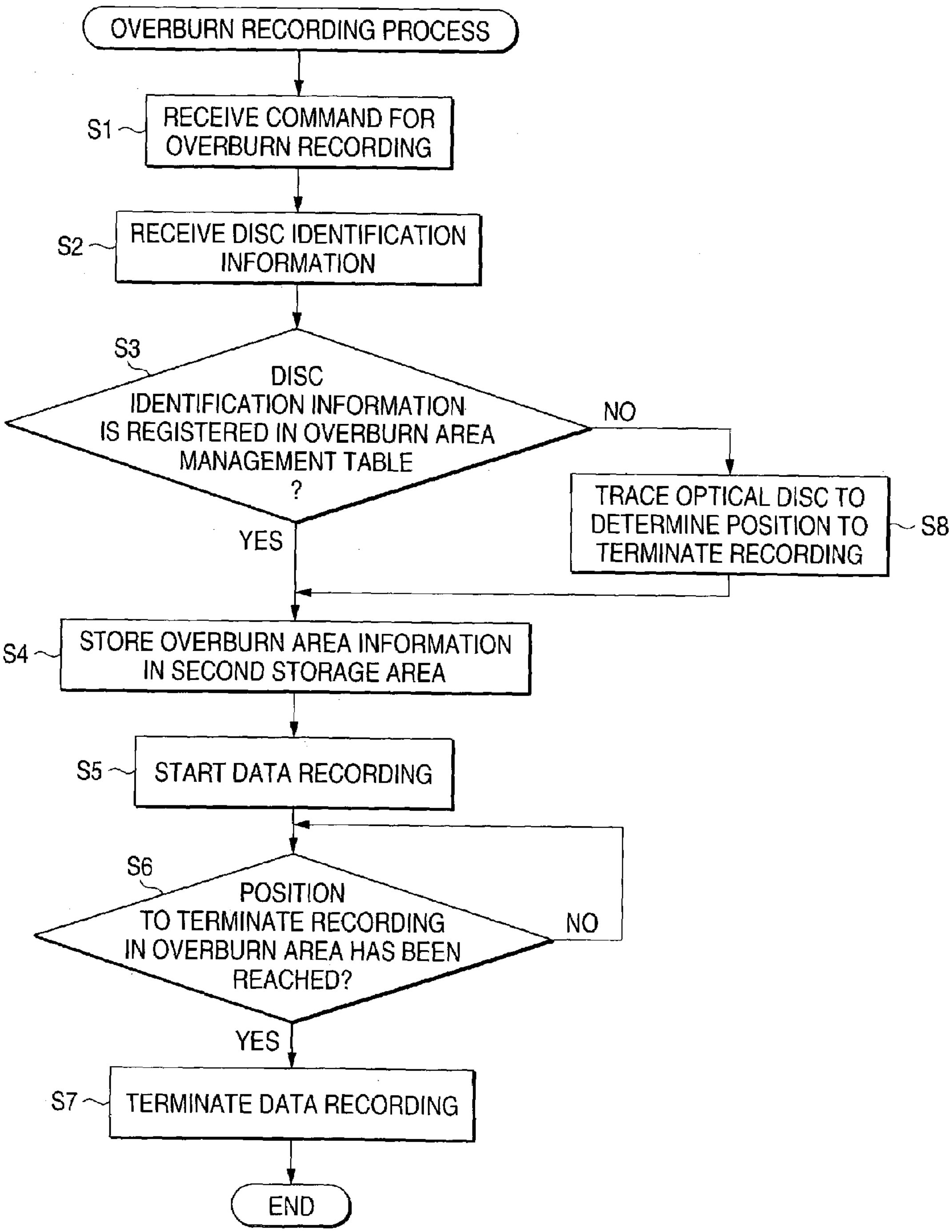
FIG. 4 is a flowchart showing an overburn recording process according to the embodiment.

FIG. 4 is a flow chart for explaining the overburn recording process.

When the CPU 331 receives the command from the host computer to record the data in a volume in the excess of the disc specification in the optical disc D (step S1), it transmits a command to the disc identification information acquisition unit 322 to acquire identification information of the optical disc D.

Upon receipt of the command from the CPU 331, the disc identification information acquisition unit 322 acquires disc identification information for identifying the optical disc D that is recorded in a read-in area (not shown) of the optical disc D and outputs it to the CPU 331.

When the disc identification information is received from the disc identification information acquisition unit 322 (step S2), the CPU 331 stores it in the first storage area 333*a* (see FIG. 3) and judges whether the disc identification information is registered in the overburn area management table TA (see FIG. 2) (step S3)

<The case wherein the disc identification information is registered in the overburn area management table TA>

For example, when the CPU 331 judges that the disc identification information received from the disc identification information acquisition unit 322, i.e., a manufacturer identification code and a product identification code are "Y . . . " and "Y-A . . . " respectively and are registered in the overburn area management table TA (YES at step S3), the process proceeds to step S4 where overburn area information (that is an address corresponding to a position to terminate recording in an overburn area) registered in association with the disc identification information is read from the overburn area management table TA and is stored in the second storage area 333*b* (see FIG. 3).

When the process at step S4 finishes, the CPU 331 starts recording data on the optical disc D and starts comparing current address information sequentially supplied from the current address information acquisition unit 321 with the overburn area information stored in the second storage area 333*b* (steps S5 and S6).

At step 36, the CPU 331 judges whether the recording position in the current point in time indicated by the current address information thus received corresponds to the position to terminate recording the overburn area indicated by the overburn area information. When it is judged that the recording position in the current point in time does not correspond to the position to terminate recording in the overburn area (that is, when it is judged that the position to terminate recording has not been reached), the CPU 331 repeats the process at step S6.

When it is judged at step 56 that the recording position in the current point in time agrees with the position to terminate recording in the overburn area (that is, when it is judged that the position to terminate recording has been reached), the CPU 331 proceeds to step 37 to terminate recording of data on the optical disc D (see FIG. 5) and terminates the overburn recording process as described above.

<The case wherein the disc identification information is not registered in the overburn area management table TA>

For example, it is judges that the disc identification information received from the disc identification information acquisition unit 322, i.e., a manufacturer identification code and a product identification code are "Z . . . " and "Z-A . . . " respectively and are not registered in the overburn area management table TA (NO at step S3), the CPU 331 performs control to trace the optical disc D from a position inside the outer circumference of the normal recording area thereof (or to move the optical pickup 310 in the radial direction of the optical disc D utilizing a track kick) to determine a position to terminate recording (step S8). Specifically, the CPU 331 determines a position (absolute time on the optical disc D) where it becomes unable to properly read the current address information indicating the current position of the optical pickup 310 (absolute time on the optical disc D) acquired by the current address information acquisition unit 321 as the position to terminate recording. Since the power of a laser beam emitted toward the optical disc D during tracing is smaller than the power of a laser beam emitted toward the optical disc D during data recording, the laser beam will not cause any damage to the optical disc D and the optical pickup 310 even when it is emitted toward a no-address information area.

When the process at step S8 finishes, the CPU 331 proceeds to step S4 where an address corresponding to the position to terminate recording thus determined is stored in the second storage area 333*b* (step S4), Subsequent operations will not be described because the above description equally applies.

As described above, in the optical disc recording apparatus 300 of the present embodiment, overburn area information indicating a position to terminate recording is set in the second storage area 333*b* of the volatile memory 333 when data is recorded in an overburn area. The optical disc recording apparatus 300 records data in the overburn area by referring to the overburn area information set in the second storage area 333*b* and terminated at a recording when the recording position in the current point in time corresponds to the position to terminate recording indicated by the overburn area information set in the second storage area 333*b*. That is, since data recording will not be continued until a servo error occurs as described in the section of the related art, any abnormal operation of the optical disc recording apparatus 300 can be prevented.

Figure 5:
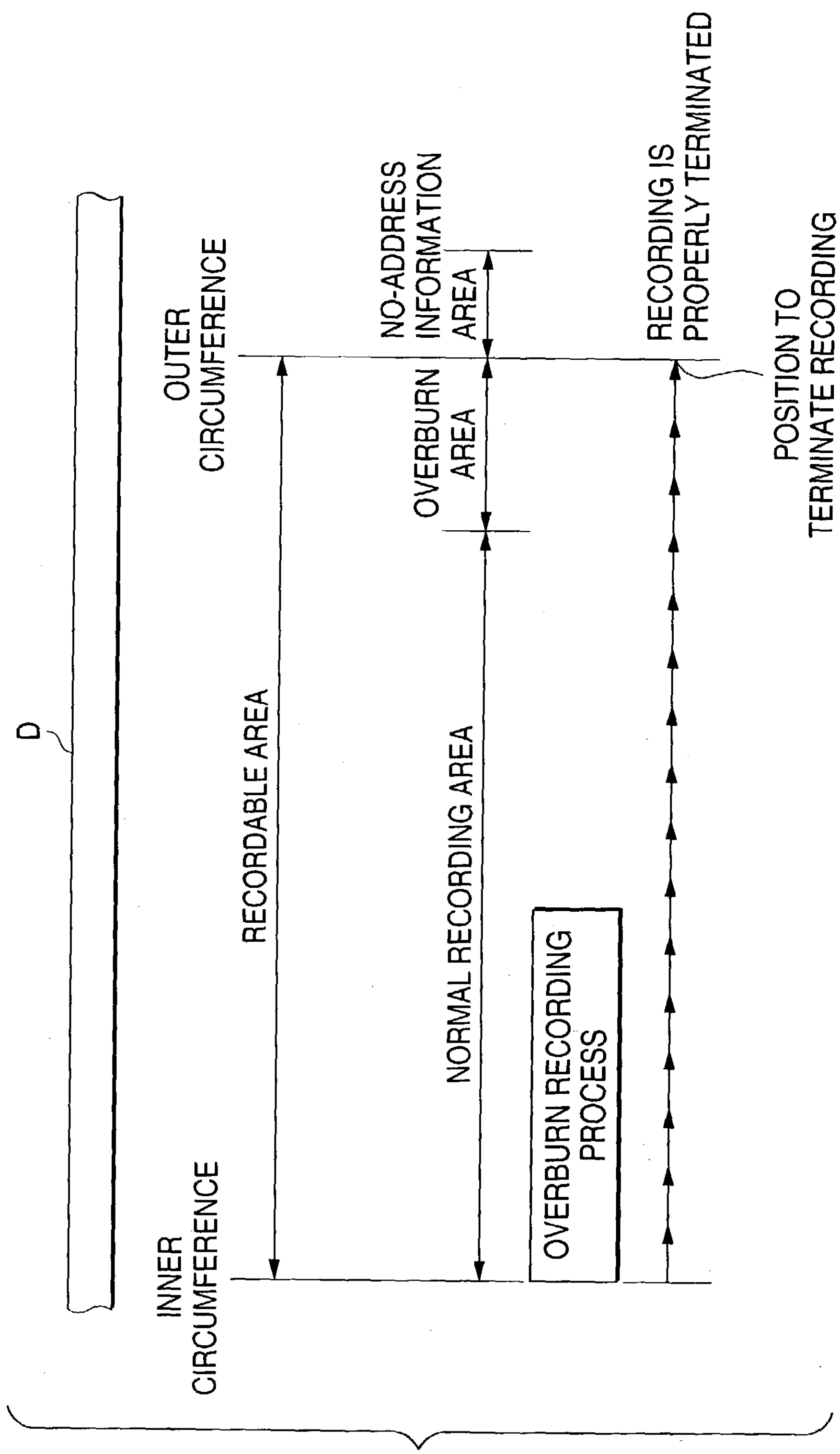
FIG. 5 illustrates the overburn recording process according to the embodiment.

Only when it is judged that disc identification information acquired from an optical disc D is not registered in the overburn area management table TA (see step S3 shown in FIG. 4), the optical disc recording apparatus 300 of the present embodiment moves the optical pickup 310 in the radial direction of the optical disc D to trace the same from a position inside the outer circumference of a normal recording area thereof, thereby determine a position to terminate recording in an overburn area of the same (see FIG. 5). This makes it possible to reduce the number of times the tracing is performed compared to a case in which a position to terminate recording in the overburn area is determined by always moving the optical pickup 310 in the radial direction of the optical disc D to trace the same.

(3) Modification

While an embodiment of the invention has been described above, the above embodiment is merely an example, and the embodiment may be modified in various ways without departing from the scope of the teachings of the invention. For example, possible modifications include the followings.

<First Modification>

While the above embodiment has been described on an assumption that data in a volume in the excess of a disc specification is recorded in an optical disc D, it is a common practice to record data in a volume within the disc specification in the optical disc D. Therefore, in a first modification, it is judged whether the volume of data to be recorded is in the excess of the disc specification or whether it is within the disc specification before starting to record the data in the disc D.

Figure 6:
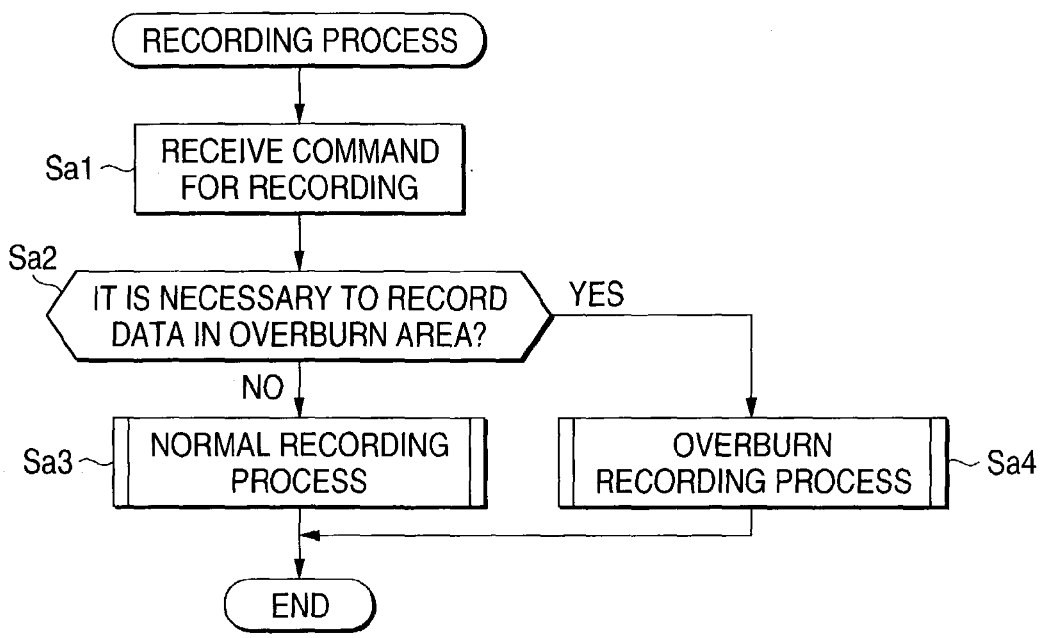
FIG. 6 is a flow chart showing a recording process according to a first modification.

FIG. 6 is a flow chart showing a recording process according to the first modification.

When the CPU 331 receives an instruction to perform recording on an optical disc D from a host computer (step Sa1), it acquires-a data volume recordable in the normal recording area (e.g., "650 MB" or "700 MB") that is recorded on the optical disc D in advance from the decoder 320, identifies the volume of data to be recorded that is transferred from a hard disc by referring to data volume information included in the data, and judges whether data recording can be completed without recording the data in the overburn area or whether the entire data can be recorded in the normal recording area (step Sa2).

When it is judged that there is no need for recording the data in the overburn area (NO at step Sa2), the CPU 331 proceeds to step Sa3 to perform a normal recording process. When it is judged that there is a need for recording the data in the overburn area (YES at step Sa2), the CPU 331 proceeds to step Sa4 to perform an overburn recording process and to finish recording of the data on the optical disc D.

It is possible to minimize operations required for overburn recording by judging whether the volume of the data to be recorded is in the excess of the disc specification or whether it is within the disc specification before starting to record the data on the optical disc D as described above. When it is judged that the data must be recorded in the overburn area (YES at step Sa2), the CPU 331 may display a character message prompting a judgment on whether to record the data in the overburn area (e.g., "Will you try overburn recording?") on a display section (not shown) to allow overburn recording to be performed only when a response is input to indicate an intention to record the data in the overburn area.

<Second Modification>

When a position to terminate data recording (recording terminating position) is determined at step S8 shown in FIG. 4 by performing control for tracing the optical disc D from a position inside the outer circumference of the normal recording area of the optical disc D, information regarding the recording terminating position thus determined and the identification information of the optical disc D may be newly registered in the overburn area management table TA. By newly registering the information regarding the recording terminating position thus determined and the identification information of the optical disc D in the overburn area management table TA as thus described, it is possible to minimize operations such as the control for tracing the optical disc D from a position inside the outer circumference of the normal recording area to determine the position to terminate recording.

<Third Modification>

Figure 7A:
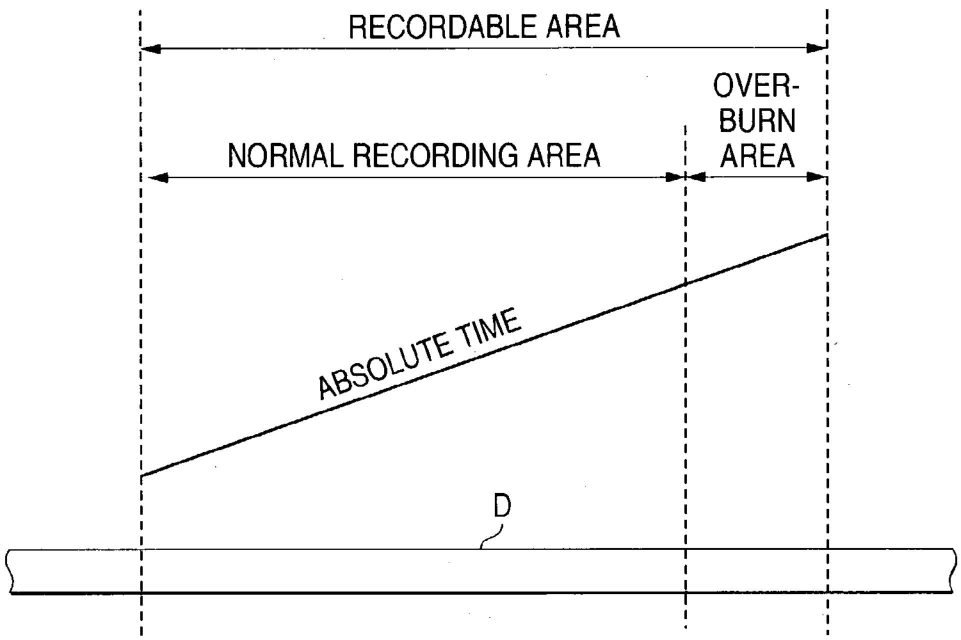
FIGS. 7A and 7B are illustrations for explaining current address information according to a third modification.
Figure 7B:
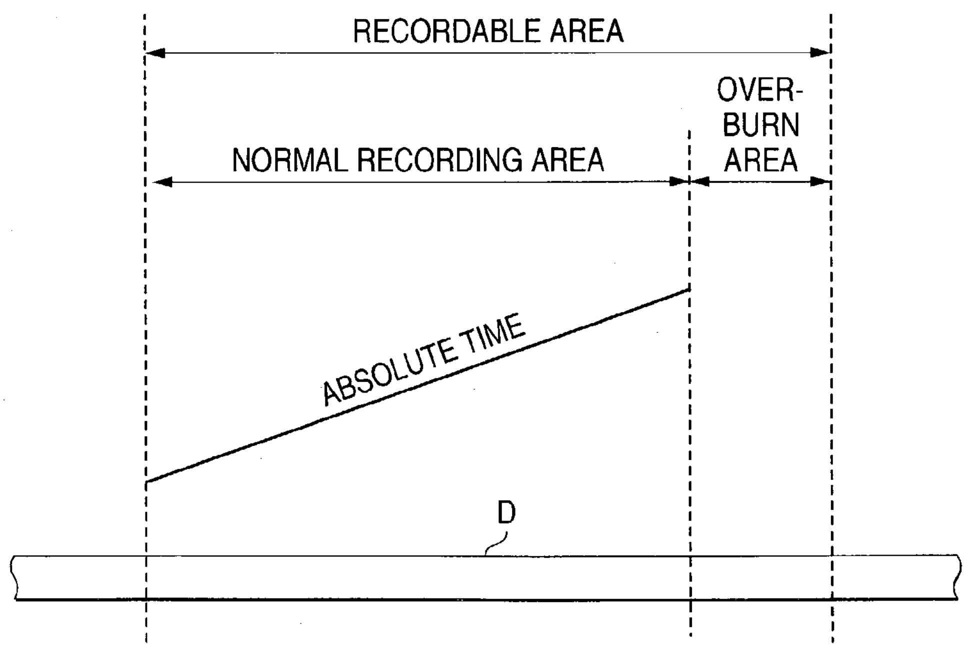

FIGS. 7A and 7B are illustrations for explaining current address information indicating the current position (that is absolute time on an optical disc D) of the optical pickup 310 acquired by the current address information acquisition unit 321.

In the above embodiment, as shown in FIG. 7A, a position where it becomes impossible to properly read current address information acquired by tracing an optical disc D or a position where the increase of the absolute time on the optical disc D becomes non-linear is determined as a position to terminate recording. Alternatively, a position where a pregroove (guide groove) formed on an optical disc D is discontinued may be determined as a position to terminate recording instead of a position where it becomes impossible to properly read the current address acquired by tracing the optical disc D, as shown in FIG. 7B for example. Such a position to terminate recording may be arbitrarily determined within the range where the pregroove is formed.

<Fourth Modification>

The above embodiment has a configuration in which a position to terminate recording is determined by tracing an optical disc D from a position inside the outer circumference of the normal recording area thereof when it is judged that identification information of the disc is not registered in the overburn area management table TA. Alternatively, in the case of an optical disc recording apparatus without such an overburn area management table TA, a position to terminate recording may be determined by performing tracing as described above each time an instruction is input to start recording data on a disc.

While the above embodiment has been described with reference to an overburn area management table TA (see FIG. 2) in which disc identification information and overburn area information is registered in association with each other, only overburn area information may be registered in the overburn area management table TA. For example, overburn area information that applies to any optical disc without depending on types of optical discs (e.g., a data volume "10 MB" that can be recorded in an overburn area)

may be registered in the overburn area management table TA, and the registered contents may be updated as occasions demand. It is thus possible to register only overburn area information in the overburn area management table.

<Fifth Modification>

While the above embodiment has referred to a CD-R as an example of an optical disc D on which data is to be recorded, the invention may be applied to optical discs represented by CD-RWs (Compact Disc ReWritable) DVD-Rs (Digital Versatile Disc Recordable), DVD-RAMs (digital Versatile Disc Random Access Momories), and PC-RWs (Phase Change ReWritable) and disc-shaped recording media such as FDs (floppy discs) and MOs (Magneto-Optical Discs).

<Sixth Modification>

The functions of the above-described optical disc recording apparatus 300 (e.g., the overburn recording process shown in FIG. 4) may be achieved by software. Specifically, a recording medium (e.g., a CD-ROM) having the same software recorded therein may be installed in the optical disc recording apparatus 300. Alternatively, the software may be downloaded from a server through a network (e.g., internet) and installed in the optical disc recording apparatus 300 through a host computer. Thus, the above-described functions maybe achieved by software. Each of the above-described modifications may obviously be applied to a different modification.

As described above, the invention makes it possible to terminate a recording operation properly without causing any abnormal operation of a disc recording apparatus even when data is recorded in an overburn area of a disc.

What is claimed is:

1. A disc recording apparatus capable of recording data in an overburn area provided outside of a recording area defined by a specification of a disc, comprising:

a storage unit that stores overburn area information used for determining a position to terminate data recording; and a recording control unit that terminates the data recording when it is detected that a recording position on the disc reaches the position to terminate the data recording determined by the overburn area information during recording of the data in the overburn area of the disc.

2. The disc recording apparatus according to claim 1, further comprising:

an acquisition unit that acquires disc identification information recorded on the disc in advance, wherein the storage unit stores identification information in association with the overburn area information, and wherein the recording control unit terminates the data recording when it is detected that a recording position reaches the position to terminate data recording determined by the overburn area information stored in association with the disc identification information acquired by the acquisition unit during recording of the data in the overburn area of the disc.

3. The disc recording apparatus according to claim 2, wherein the disc identification information is information for identifying at least either of the manufacturer of the disc or the type of the disc.

4. The disc recording apparatus according to claim 1, wherein the overburn area information is information indicating an address corresponding to the position to terminate the data recording in the overburn area or a data volume that can be recorded in the overburn area.

5. The disc recording apparatus according to claim 1, further comprising a judging unit that judges whether there is a need for recording the data in the overburn area by acquiring data volume information which is recorded in the disc in advance and indicates a data volume that can be recorded in the recording area within the disc specification, and by identifying the volume of the data to be recorded on the disc wherein the recording control unit controls the data recording in the overburn area when the judging unit judges that there is a need for recording the data in the overburn area and terminates the data recording when it is detected that the recording position on the disc reaches the position to terminate the data recording determined by the overburn area information during recording of the data in the overburn area.

6. The disc recording apparatus according to claim 5, further comprising:

a prompting unit that prompts a user to judge whether to record the data in the overburn area when the judging unit judges that there is a need for recording the data in the overburn area, and an input unit that inputs a response to the prompt, wherein the recording control unit controls the data recording in the overburn area of the disc when the response input with the input unit is a response indicating an intention to record the data in the overburn area.

7. A disc recording apparatus capable of recording data in an overburn area provided outside a recording area defined by a specification of a disc, comprising:

an input unit that inputs an instruction to start recording the data on the disc;

a determination unit that determines a position to terminate data recording in the overburn area by tracing the disc after the recording start instruction is input with the input unit and before recording of the data on the disc is started; and a recording control unit that terminates the data recording when it is detected that a recording position on the disc reaches the position to terminate the data recording determined by the determination unit during recording of the data in the overburn area of the disc after recording of the data on the disc is started.

8. The disc recording apparatus according to claim 7, further including a judging unit that judges whether there is a need for recording the data in the overburn area by acquiring data volume information which is recorded in the disc in advance and indicates a data volume that can be recorded in a recording area within the disc specification, and by identifying the volume of the data to be recorded on the disc, and wherein the determination unit determines the position to terminate data recording in the overburn area by tracing the disc when the judging unit judges that there is a need for recording the data in the overburn area.

9. A disc recording apparatus according to claim 8, wherein the determination unit determines a position where the increase of absolute time on the disc obtained by tracing the disc becomes non-monotonous as the position to terminate the data recording in the overburn area.

10. A method of recording data in an overburn area which is provided outside of a recording area defined by a specification of a disc, comprising the steps of:

reading overburn area information associated with the disc from a storage unit for storing the overburn area information for determining positions to terminate data recording; and terminating the data recording on the disc when it is detected that a recording position reaches a position to terminate the data recording determined by the overburn area information during recording of the data in the overburn area of the disc.

11. A method of recording data in an overburn area which is provided outside a recording area defined by a specification of a disc, comprising the steps of:

inputting an instruction to start recording the data on the disc;

determining a position to terminate data recording in the overburn area by tracing the disc after the recording start instruction is input and before recording of the data a on the disc is started; and terminating the data recording on the disc when it is detected that a recording position reaches the position to terminate the data recording during recording of the data in the overburn area of the disc after recording of the data on the disc is started.

12. A disc recording control program embodied on a computer readable medium causing a computer of a disc recording apparatus capable of recording data in an overburn area which is provided outside a recording area of a specification of a disc to function as:

a storage unit for storing overburn area information for determining a position to terminate data recording; and a recording control unit for terminating the data recording when it is detected that a recording position reaches the position to terminate the data recording determined by the overburn area information during recording of the data in the overburn area of the disc.

13. A disc recording control program embodied on a computer readable medium causing a computer of a disc recording apparatus capable of recording data in an overburn area which is provided outside a recording area defined by a specification of a disc to function as:

an input unit for inputting an instruction to start recording the data on the disc;

a determination unit for determining a position to terminate data recording in the overburn area by tracing the disc after the recording start instruction is input with the input unit and before recording of the data on the disc is started; and a recording control unit for terminating the data recording when it is detected that the recording position reaches the position to terminate data recording determined by the determination unit during recording of the data in the overburn area of the disc after recording of the data on the disc is started.

14. A disc recording apparatus for recording data in an overburn area which is provided outside a recording area defined by a specification of a disc, comprising:

means for reading overburn area information associated with the disc from a storage unit for storing the overburn area information for determining positions to terminate data recording; and means for terminating the data recording the data recording on the disc when it is detected that a recording position reaches a position to terminate data recording determined by the overburn area information during recording of the data in the overburn area of the disc.

15. A disc recording apparatus for recording data in an overburn area which is provided outside a recording area defined by a specification of a disc, comprising:

means for reading overburn area information associated with the disc from a storage unit for storing the overburn area information for determining positions to terminate data recording; and means for terminating the data recording on the disc when it is detected that a recording position reaches the position to terminate the data recording thus determined during recording of the data in the overburn area of the disc after recording of the data on the disc is started.

16. A disc recording apparatus capable of recording data in a recording area out of a specification of a disc, comprising:

a storage unit that stores overburn area information for determining a position to terminate data recording;

a recording control unit that terminates an operation of recording the data on the disc when it is detected that the recording position of the data on the disc reaches the position to terminate data recording determined by the overburn area information during recording of the data in the overburn area of the disc; and an acquisition unit that acquires identification information of the disc recorded on the disc in advance, wherein the storage unit stores identification information of a plurality of discs and overburn area information for determining positions to terminate data recording in association with each other, and wherein the recording control unit terminates the operation of recording the data on the disc when it is detected that the recording position of the data on the disc reaches a position to terminate data recording determined by overburn area information associated with the disc identification information acquired by the acquisition unit during recording of the data in the overburn area of the disc.

17. The disc recording apparatus according to claim 16, wherein the identification information of the disc is information for identifying at least either of the manufacturer of the disc or the type of the disc.

18. A disc recording apparatus capable of recording data in a recording area out of a specification of a disc, comprising:

a storage unit that stores overburn area information for determining a position to terminate data recording;

a recording control unit that terminates an operation of recording the data on the disc when it is detected that the recording position of the data on the disc reaches the position to terminate data recording determined by the overburn area information during recording of the data in the overburn area of the disc; and a judging unit that acquires a data volume that can be recorded in a recording area within the disc specification and is recorded in the disc in advance, identifying the volume of the data to be recorded on the disc, and judging whether there is a need for recording the data in the overburn area, wherein the recording control unit records the data in the overburn area when the judging unit judges that there is a need for recording the data in the overburn area and terminates the operation of recording the data on the disc when it is detected that the recording position of the data on the disc reaches the position to terminate data recording determined by the overburn area information during recording of the data in the overburn area.

19. The disc recording apparatus according to claim 18, further comprising:

a prompting unit that prompts a user to judge whether to record the data in the overburn area when the judging unit judges that these is a need for recording the data in the overburn area; and an input unit that inputs a response to the prompt, wherein the recording control unit records the data in the overburn area of the disc when the response input with the input unit is a response indicating an intention to record the data in the overburn area.

20. A disc recording apparatus capable of recording data in an overburn area of a disc, comprising:

an input unit that inputs an instruction to start recording the data on the disc;

a determination unit that determines a position to terminate data recording in the overburn area by tracing the disc after the recording start instruction is input with the input unit and before recording of the data on the disc is started; and a recording control unit that terminates the operation of recording the data on the disc when it is detected that the recording position of the data on the disc reaches the position to terminate data recording determined by the determination unit during recording of the data in the overburn area of the disc after recording of the data on the disc is started, wherein the determination unit further includes a judging unit that acquires a data volume that can be recorded in a recording area within the disc specification and is recorded in the disc in advance, identifying the volume of the data to be recorded on the disc and judging whether there is a need for recording the data in the overburn area, and wherein the determination unit determines the position to terminate data recording in the overburn area by tracing the disc when the judging unit judges that there is a heed for recording the data in the overburn area.

21. A disc recording apparatus according to claim 20, wherein the determination unit determines a position where the increase of absolute time on the disc obtained by tracing the disc becomes non-monotonous as the position to terminate data recording in the overburn area.

* * * * *